(12) United States Patent
Windeler et al.

(10) Patent No.: US 9,457,632 B1
(45) Date of Patent: *Oct. 4, 2016

(54) COLLISION AVOIDANCE METHOD INCLUDING DETERMINING HEIGHT OF AN OBJECT FIXED TO A VEHICLE

(71) Applicants: Joshua G Windeler, Grand Blanc, MI (US); Ross S Maunders, Harbor Springs, MI (US)

(72) Inventors: Joshua G Windeler, Grand Blanc, MI (US); Ross S Maunders, Harbor Springs, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/736,718

(22) Filed: Jun. 11, 2015

(51) Int. Cl.
| | |
|---|---|
| *B60D 1/36* | (2006.01) |
| *B60T 7/22* | (2006.01) |
| *B60Q 9/00* | (2006.01) |
| *B60K 35/00* | (2006.01) |
| *B60Q 1/30* | (2006.01) |

(52) U.S. Cl.
CPC .............. *B60D 1/366* (2013.01); *B60K 35/00* (2013.01); *B60Q 1/305* (2013.01); *B60Q 9/008* (2013.01); *B60T 7/22* (2013.01)

(58) Field of Classification Search
CPC . B60W 30/09; G06K 9/00791; B60K 35/00; B60K 2350/1076; B60R 1/00; B60R 2300/8093; B60T 7/20; B60D 1/36; B60D 1/58; B60D 1/06
See application file for complete search history.

(56) References Cited

U.S. PATENT DOCUMENTS

| | | | |
|---|---|---|---|
| 7,777,615 B2 | 8/2010 | Okuda et al. | |
| 8,038,166 B1 * | 10/2011 | Piesinger | B60D 1/06 280/477 |
| 2009/0040300 A1 | 2/2009 | Scribner | |
| 2010/0324770 A1 | 12/2010 | Ramsey et al. | |
| 2013/0226390 A1 * | 8/2013 | Luo | B60D 1/36 701/25 |
| 2013/0259394 A1 * | 10/2013 | Bar-On | H04N 19/176 382/233 |

* cited by examiner

*Primary Examiner* — Yuen Wong
(74) *Attorney, Agent, or Firm* — Ralph E. Smith

(57) ABSTRACT

A method and system of avoiding a collision between an object attached to a rear of a vehicle and an object behind the vehicle during reverse maneuvering of the vehicle includes determining with an electronic control unit of the vehicle an adjusted top height of a first object attached to a rear of the vehicle. The electronic control unit then determines whether the adjusted top height is lower than a clearance height of a second object behind the vehicle and unattached to the vehicle. Upon determining that the adjusted top height of the first object is not lower than the clearance height of the second object, the electronic control unit determines that the first object would collide with the second object if the vehicle is reverse maneuvered too close to the second object and upon determining that the collision would occur alerting a user of the vehicle.

8 Claims, 5 Drawing Sheets

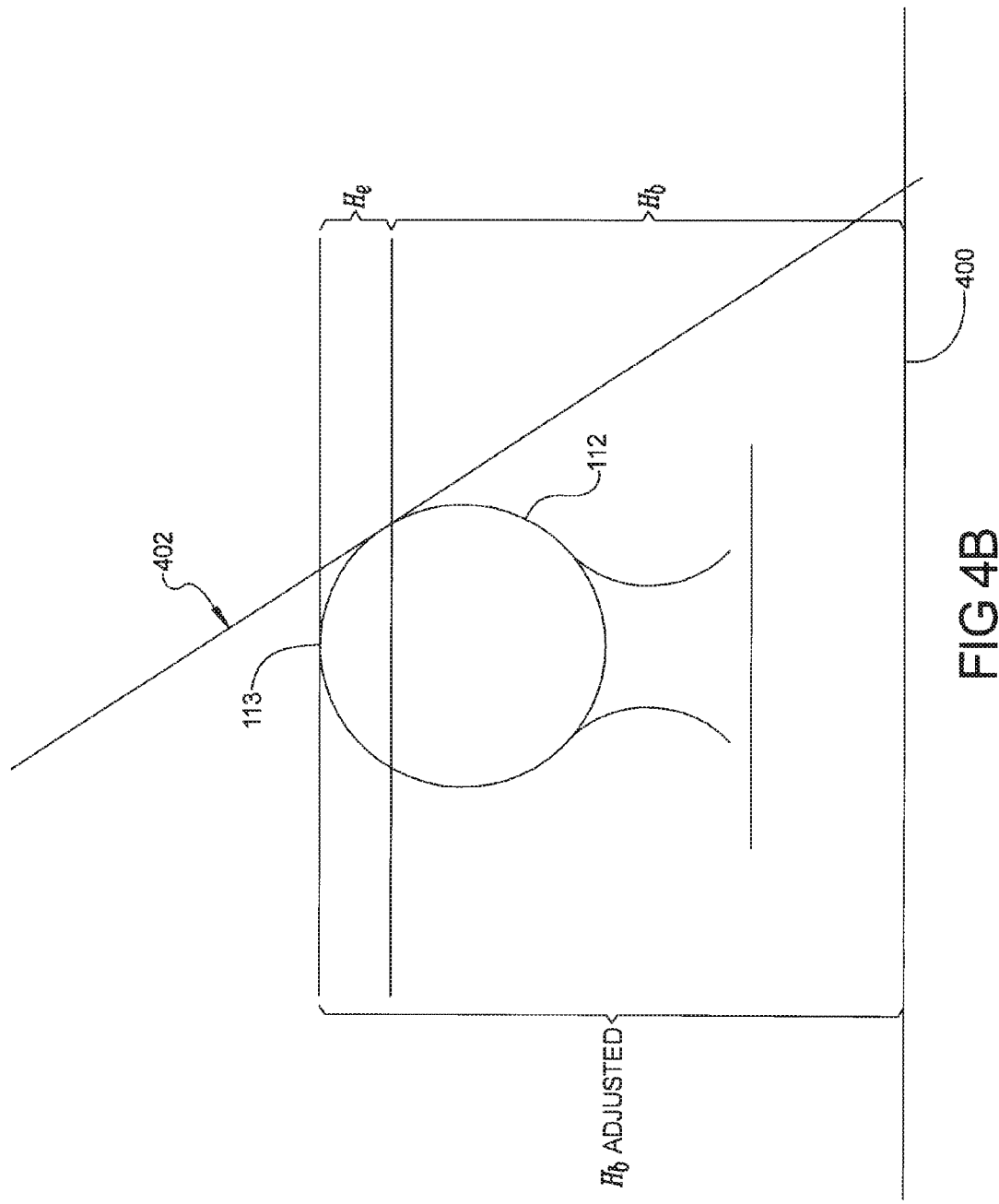

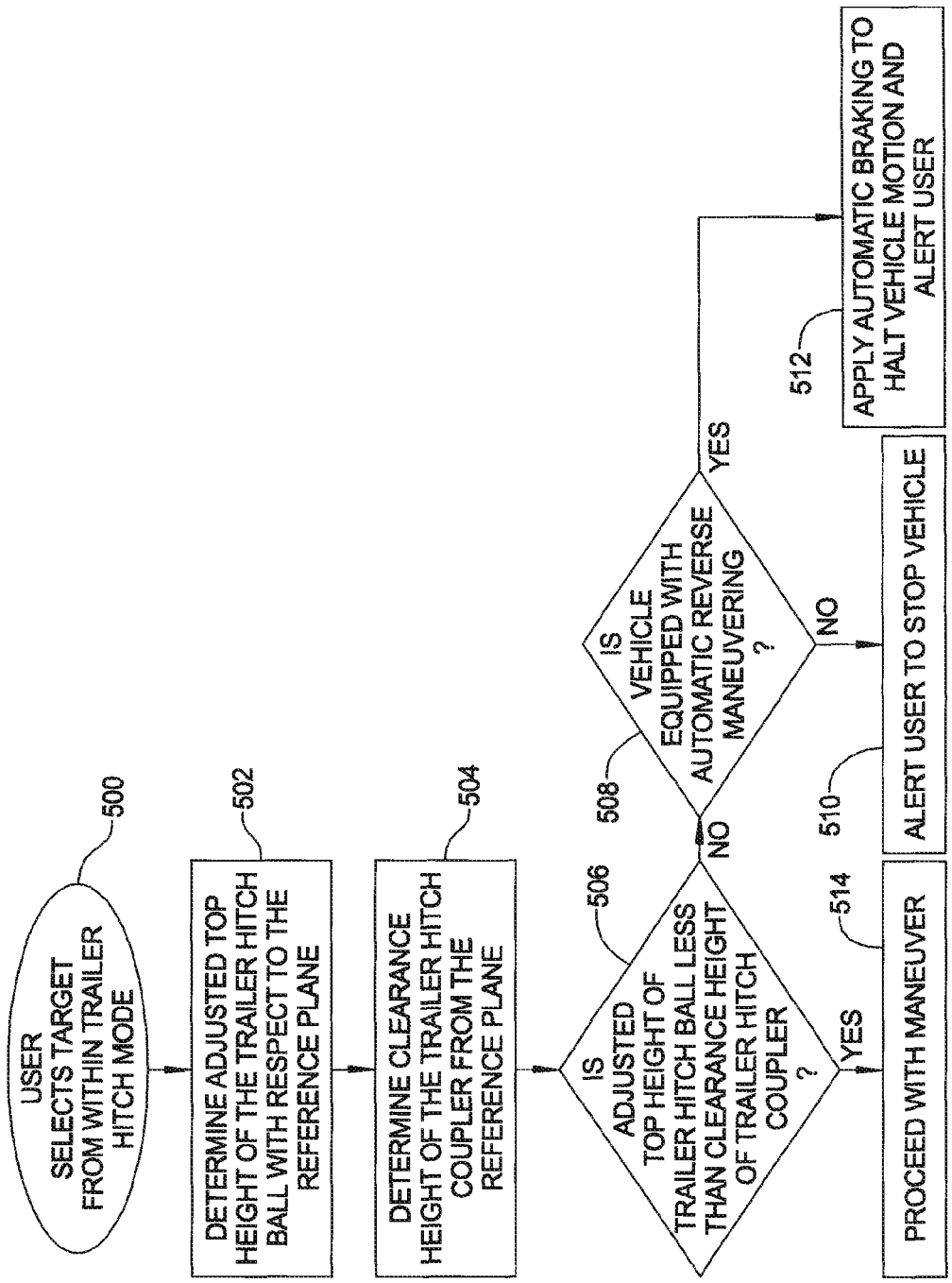

COLLISION AVOIDANCE METHOD INCLUDING DETERMINING HEIGHT OF AN OBJECT FIXED TO A VEHICLE

FIELD

The present invention relates to a collision avoidance system and method that includes determining the height of an object fixed to a vehicle using a vision system of the vehicle.

BACKGROUND

Trailers are typically hitched to vehicles using, in the case of passenger vehicles, a trailer hitch that is mounted at the lower rear of the vehicle. The trailer hitch coupling is at a similar height. The vehicle driver must then manipulate the vehicle to align the trailer hitch with the trailer hitch coupling, which is typically disposed at a front of the trailer. When the rear of the vehicle gets close to the front of the trailer, the driver of the vehicle typically cannot see either the trailer hitch or the trailer hitch coupling. Further, when manipulating the vehicle to align the trailer hitch to the trailer hitch coupling, the driver is typically operating the vehicle in reverse.

There are systems that provide guidance to the driver to aid the driver in aligning the trailer hitch with the trailer hitch coupling. There are for example the systems disclosed in US 2013/0226390 for "Hitch Alignment Assistance," US 2010/324770 for "Trailer Hitch Alignment Device and Method," US 2009/0040300 for "Removably Mountable, Portable Vision System," and U.S. Pat. No. 7,777,615 for "System for Assisting the Attachment of a Trailer to a Vehicle."

These systems do not determine the height of the ball of the trailer hitch. Knowing the height the ball of the trailer hitch can be advantageous in determining whether the ball of the trailer hitch will collide with the trailer hitch coupling of the trailer as the vehicle is backed toward the trailer or if the ball is lower than the trailer hitch coupling so that it will pass under the trailer hitch coupling.

SUMMARY

In accordance with an aspect of the present disclosure, a method of avoiding a collision between an attached object attached to a rear of a vehicle and an unattached object behind and unattached to the vehicle during reverse maneuvering of the vehicle includes determining with an electronic control unit of the vehicle and a rear facing vision system of the vehicle an adjusted top height $H_{b\ adjusted}$ of the attached object. The determination of the adjusted top height $H_{b\ adjusted}$ of the attached object includes:

determining with the electronic control unit an angle β which is an angle between a reference plane lying on the ground surface and a line of sight of a vision sensor of the rear facing vision system that is tangent to the attached object by the equation $\beta=\arctan(H_c/D_a)$ where $H_c$ is the height of the vision sensor above the reference plane and $D_a$ is a lateral distance between a perpendicular plane which extends through the vision sensor and a point where the line of sight intersects the reference plane;

determining with the electronic control unit a distance $D_b$ that the attached object is away from the vision sensor by using perspective equation $D_b=f+f/\text{ABS}(y_i/y_o)$ where f is a focal length of a lens of a vision sensor of rear facing vision system which is pre-programmed in the electronic control unit, $y_i$ is a height of an image of the object seen by the rear facing vision system determined by the electronic control unit and $y_o$ is a height of the object pre-programmed into the electronic control unit;

determining with the electronic control unit a height $H_a$ from a top of the attached object to the vision sensor by the equation $H_a=\sin(\beta)*D_b$;

determining with the electronic control unit a height $H_b$ that the top of the attached object is above the reference plane by the equation $H_b=H_c-H_a$;

adjusting for error with the electronic control unit to determine an adjusted height $H_{b\ adjusted}$ that the attached object is above the reference plane by the equation $H_{b\ adjusted}=H_b+E$ where E is a fixed value;

The method further includes determining with the electronic control unit whether the adjusted top height $H_{b\ adjusted}$ of the attached object is lower than a clearance height of the unattached object. The clearance height of the unattached object is a distance between a bottom of the unattached object and the ground surface. Upon determining with the electronic control unit that the adjusted top height $H_{b\ adjusted}$ of the attached object is not lower that the clearance height of the unattached object, determining with the electronic control unit that the attached object would collide with the unattached object if the vehicle is reverse maneuvered too close to the unattached object. Then, upon determining that the collision would occur, alerting a user of the vehicle by having the electronic control display on a display an alert indicating that the collision would occur.

In an aspect, the method further includes that upon determining that the collision would occur, determining with the electronic control unit whether the vehicle is equipped with automatic reverse maneuvering. Then, upon determining that the vehicle is equipped with automatic reverse maneuvering, having the electronic control unit cause automatic braking of the vehicle to a halt.

In an aspect, the method is implemented in a collision avoidance system for a vehicle that includes the electronic control unit configured to implement the method using the rear facing vision system.

BRIEF DESCRIPTION OF THE DRAWINGS

The present invention will become more fully understood from the detailed description and the accompanying drawings, wherein:

FIG. 4A is diagrammatic view of a vehicle having a trailer hitch attached to the rear of the vehicle and FIG. 4B is a diagrammatic view of the trailer hitch of FIG. 4A; and FIG. 5 is a flow chart of a collision avoidance method in accordance with an aspect of the present disclosure.

DETAILED DESCRIPTION

Figure 1:
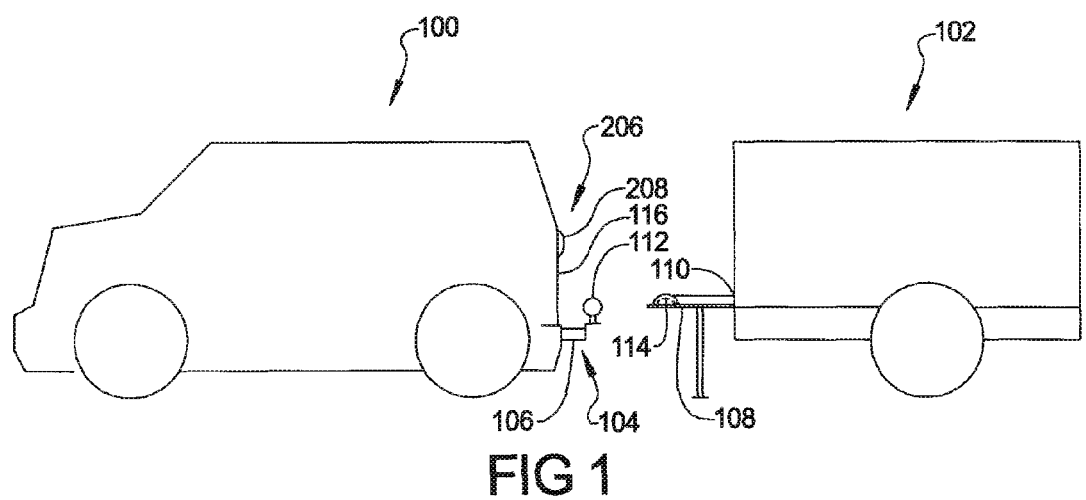
FIG. 1 is a simplified diagrammatic view of a vehicle and a trailer.

The following description of the preferred embodiment(s) is merely exemplary in nature and is in no way intended to limit the invention, its application, or uses. Corresponding reference numerals indicate corresponding parts throughout the several views of the drawings.

FIG. 1 is a simplified diagrammatic view of a vehicle 100 and trailer 102. Vehicle 100 has a trailer hitch 104 mounted at a lower rear 106 of vehicle 100 that projects rearwardly from the lower rear 106 of vehicle 100. Trailer 102 has a trailer hitch coupling 108 at a lower front 110 of trailer 102. Trailer hitch coupling 108 projects forwardly from lower front 110 of trailer 102. Trailer hitch 104 is shown as a typical ball type trailer hitch having a ball 112 over which a recess 114 of trailer hitch coupling 108 is received. Ball 112 will be referred to herein as trailer hitch ball 112.

To hitch trailer 102 to vehicle 100, a driver of the vehicle must back vehicle 100 (drive vehicle 100 in reverse) so that trailer hitch 104 aligns with trailer hitch coupling 108. A collision avoidance method in accordance with an aspect of the present disclosure described in more detail below determines a height of trailer hitch ball 112 of trailer hitch 104.

Figure 2:
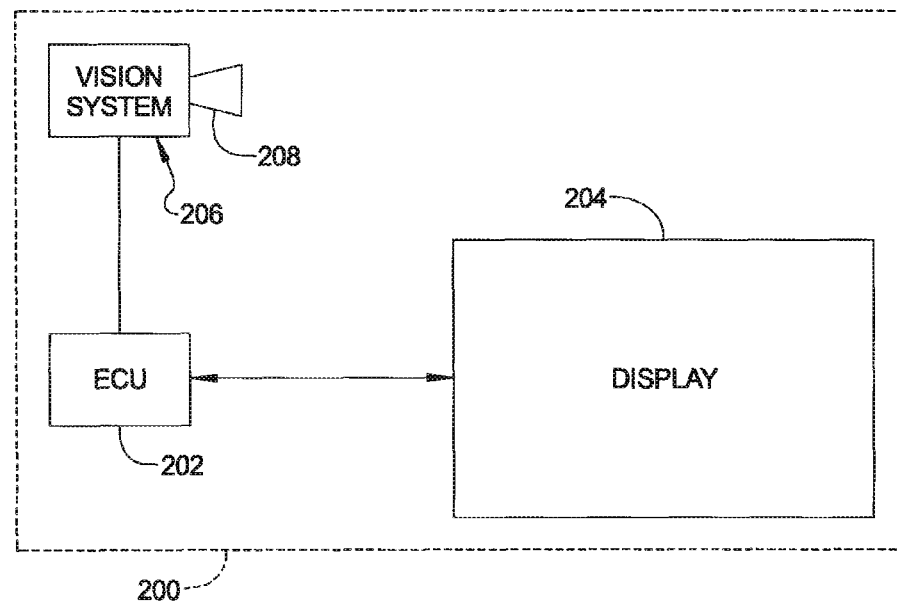
FIG. 2 is a basic block diagram of a system in accordance with an aspect of the present disclosure that provides a collision avoidance method in accordance with an aspect of the present disclosure.

FIG. 2 is a basic block diagram of a collision avoidance system 200 in accordance with an aspect of the present disclosure that implements the above discussed collision avoidance method. System 200 includes an electronic control unit ("ECU") 202, a display 204, and a rear facing vision system 206 that "sees" an area behind a rear of vehicle 100. That is, the field of vision of rear facing vision system 206 is an area behind a rear of the vehicle. System 200 is installed in a vehicle, for example, vehicle 100 and a vision sensor 208, such as a camera, of rear facing vision system 206 mounted on a rear 116 of vehicle 100 above trailer hitch ball 112 as shown in FIG. 1. In an aspect, ECU 202 is an ECU of vehicle 100, such as a body controller. In an aspect, ECU 202 is a separate ECU mounted in vehicle 100. The display 204 for example is a known type display of a radio head unit mounted for example in a center of the instrument panel of the vehicle. Display 204 is also a known type of touch screen display such as those currently used for displays of certain radio head units. Rear facing vision system 206 is a known type of vision system where the horizontal image lines each represent a certain distance from the rear of the vehicle. One such example has distance lines overlayed upon the video screen and are color coded to represent the distances from the rear of the vehicle.

Figure 3:
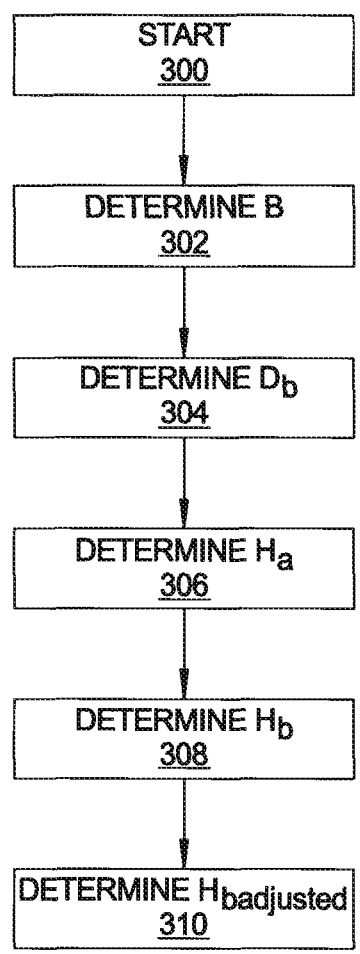
FIG. 3 is a flow chart of a method for determining a height of an object attached to a rear of a vehicle.
Figure 4A:
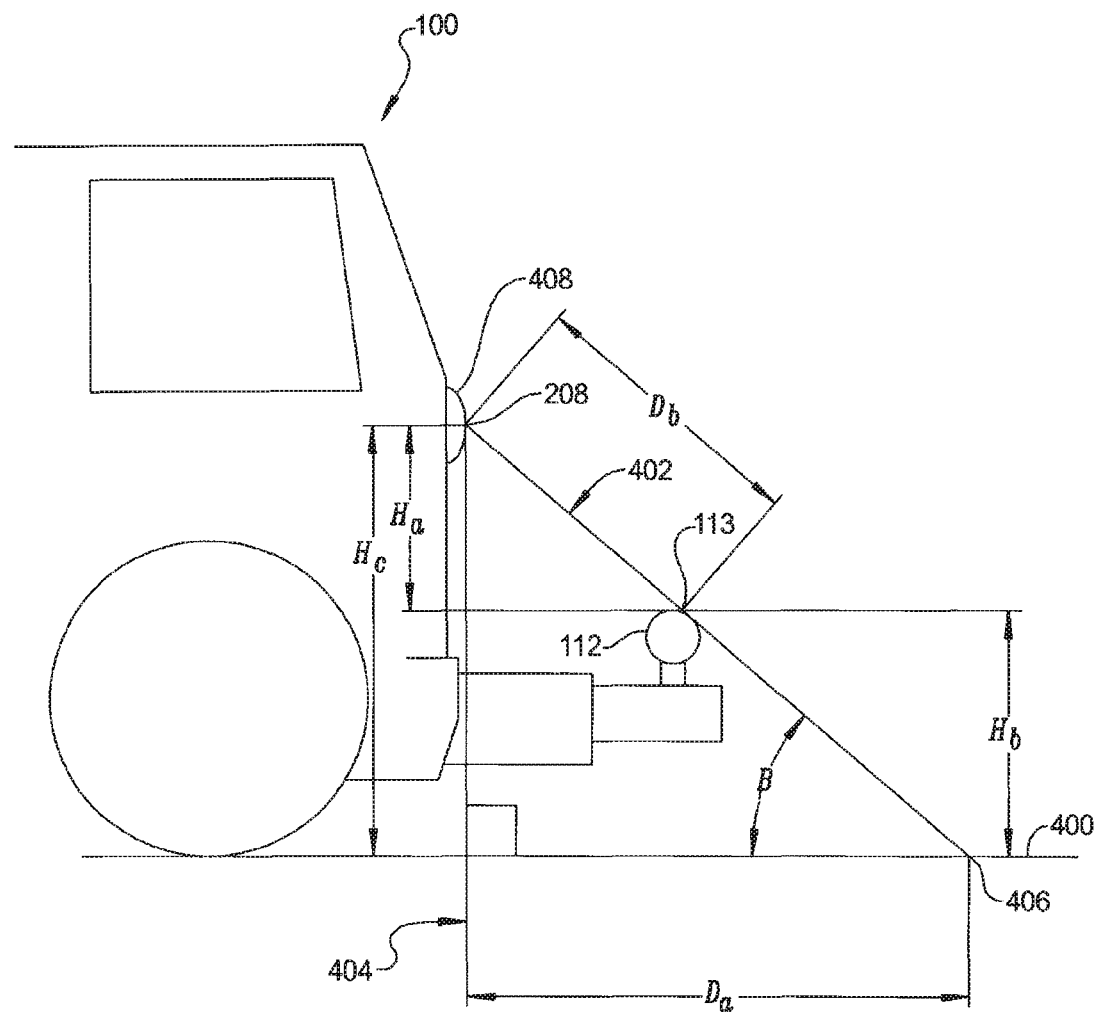

FIG. 3 is a flow chart of a method in accordance with an aspect of the present disclosure to determine a height of trailer hitch ball 112. ECU 202 is configured to implement the method of FIG. 3, such as by software programmed into ECU 202. With reference to FIGS. 1 and 4A and 4B, a height $H_{b\ adjusted}$ of a top of trailer hitch ball 112 above a reference plane 400 is determined by the method of FIG. 3. A vertical height $y_o$ of trailer hitch ball 112 itself (as oriented when trailer hitch ball 112 is mounted on vehicle 100) size is pre-stored in ECU 202, for example, by being entered into ECU 202 when during manufacture of vehicle 100 or otherwise when trailer hitch 104 is installed on vehicle 104 such as in the case of an aftermarket installation. Illustratively, $y_o$ is a diameter of trailer hitch ball 112. A height $H_a$ that vision sensor 208 of vision system 206 is above reference plane 400 is also pre-stored in ECU 202, for example by being entered into ECU 202 during manufacture of vehicle 100 or otherwise when visions system 206 is installed on vehicle 100 such as in the case of an aftermarket installation.

A line of sight 402 is a line extending from vision sensor 208 to reference plane 400 at a tangent to trailer hitch ball 112. The ECU 202 is programmed with or is able to determine $H_c$ (which is the height of vision sensor 208 above a reference plane 400). Reference plane 400 lies on a ground surface on which vehicle 100 is on, such as a road surface.

The method starts at 300. At 302, ECU 202 determines an angle β which is an angle between reference plane 400 and line of sight 402. ECU 202 determines β using the following equation:

$$\beta = \arctan(H_c/D_a)$$

where $H_c$ is the height of vision sensor 208 above reference plane 400 as discussed above and $D_a$ is a lateral distance between a perpendicular plane 404 which extends through vision sensor 208 and point 406 where line of sight 402 intersects reference plane 400. ECU 202 determines $D_a$ using the distance information of rear facing vision system 206. For example, ECU 202 uses the first distance line away from rear 116 of vehicle 100 that vision sensor 208 can see that is not broken by trailer ball and uses the distance corresponding to that distance line as $D_a$. The distance away from rear 116 of vehicle 100 for each distance line is for example programmed into ECU 202 or rear facing vision system 206 and based on the first unbroken distance line, ECU 202 uses distance for that distance line as $D_a$. In an aspect, if the separation between distance lines is sufficiently great, ECU 202 extrapolates between the distances for the first unbroken distance line discussed above and the adjacent distance line that vision sensor 208 sees as broken by trailer hitch ball 112 to determine $D_a$.

At 304, ECU 202 determines a distance $D_b$ that trailer hitch ball 112 is away from vision sensor 208 by using the following perspective equation:

$$D_b = f + f/\mathrm{ABS}(y_i/y_0)$$

where f is a focal length of a lens 408 of vision sensor 208 which is pre-programmed in ECU 202, $y_i$ is a height of an image of trailer hitch ball 112 seen by vision system 206 determined by ECU 202, and $y_o$ is the height of trailer hitch ball 112 pre-programmed into ECU 202 as discussed above. $y_i$ is for example the number of pixels in a vertical column of pixels of the image through the tallest part of the image converted to height units, such as millimeters or inches. At 306, the method determines a height $H_a$ from a top of trailer hitch ball 112 to vision sensor 208 using the following equation:

$$H_a = \mathrm{Sin}(\beta) * D_b$$

where β and $D_b$ are as discussed above.
At 308, the method determines a height $H_b$ that a top 113 of trailer hitch ball 112 is above reference plane 400 is by the following equation:

$$H_b = H_c - H_a$$

where $H_c$ and $H_a$ are as discussed above.
At 310, the method adjusts $H_b$ for any error introduced such as by rounding using the following equation:

$$H_{b\ adjusted} = H_b + E$$

where E is a fixed value and illustratively determined by testing and is pre-programmed in ECU 202.

In accordance with an aspect of the present disclosure, the height of trailer hitch ball 112 ($H_{b\ adjusted}$) is used to determine whether trailer hitch ball 112 would collide with trailer hitch coupling 108 during reverse maneuvering of vehicle 100 if it is backed toward trailer 102 and in an aspect used in avoiding such a collision. Reverse maneuvering of vehicle 100 is when vehicle 100 is in reverse. Such a collision avoidance method is illustratively implemented in software programmed in ECU 202 and FIG. 5 is a flow chart illustrating this method. The method starts at 500 when a user selects a target from a trailer hitch mode of ECU 202. At this point, vehicle 100 is being reverse maneuvered by the user having been put in reverse by the user. At 502, ECU 202 determines $H_{b\ adjusted}$ as discussed above. At 504, ECU 202 determines a clearance height of trailer hitch coupling 108, which is the height of a bottom edge of trailer hitch coupling 108 above the reference plane 400, which is the ground surface as discussed above. The clearance surface height is determined by taking the difference between $H_{b\ adjusted}$ and a height of the bottom edge of trailer hitch coupling 108 above the reference plane 400. The height of the bottom edge of the trailer hitch coupling is illustratively determined by use of known image processing techniques. At 506, ECU 202 determines whether the adjusted top height of trailer hitch ball 112 ($H_{b\ adjusted}$) is less than the clearance height of trailer hitch coupling 108. If the adjusted top height of trailer hitch ball 112 is not less than the clearance height of trailer hitch coupling 108, trailer hitch ball 112 is as high or higher than the bottom of trailer hitch coupling 108 and would hit trailer hitch coupling 108 if vehicle 100 is backed too closely to trailer 102. When this is the case, ECU 202 next determines at 508 whether vehicle 100 is equipped with automatic reverse maneuvering. ECU 202 then branches to 512 if vehicle 100 is equipped with automatic braking to halt motion of vehicle 100 and also communicates this status to the user such as by displaying a message or other indicator on display 204. If vehicle 100 is not equipped with automatic reverse maneuvering, ECU 202 then branches to 510 where it warns the user to stop vehicle 100, such as by displaying a message or other indicator on display 204. In an aspect, ECU 202 also provides an audible alert as well as the display on display 204. If at 506 it was determined that the height of trailer hitch ball 112 is lower than the bottom edge height of trailer hitch coupling 108, ECU branches to 514 where maneuvering of vehicle 100 can proceed.

It should be understood that the foregoing collision avoidance method is applicable to anything which is in the viewing area of rear facing vision system 206. If there is something attached to the back of vehicle 100, this method is able to predict a potential collision between that object and another object behind the vehicle which is unattached to the vehicle.

ECU 202 in which the above described methods are implemented is or includes any of a digital processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPLD), or application specific integrated circuit (ASIC). When it is stated that system 200 performs a function or is configured to perform a function, it should be understood that ECU 202 is configured to do so with appropriate logic (such as in software, logic devices, or a combination thereof).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of determining a height of an attached object attached to a rear of a vehicle and avoiding a collision between the attached object and an unattached object which is behind and unattached to the rear of the vehicle during reverse maneuvering of the vehicle on a ground surface, comprising:

determining with an electronic control unit of the vehicle and a rear facing vision system of the vehicle an adjusted top height $H_{b\ adjusted}$ Of the attached object wherein the determination of the adjusted top height $H_{b\ adjusted}$ of the attached object includes:
   determining with the electronic control unit an angle β which is an angle between a reference plane lying on the ground surface and a line of sight of a camera of the rear facing vision system that is tangent to the attached object by an equation $β=\arctan(H_c/D_a)$ where $H_c$ is a height of the camera above the reference plane and $D_a$ is a lateral distance between a perpendicular plane which extends through the camera and a point where the line of sight intersects the reference plane and determining the lateral distance $D_a$ based on distance lines of the rear facing vision system wherein each distance line is indicative of a different distance from the rear of the vehicle;
   determining with the electronic control unit a distance $D_b$ that the attached object is away from the camera by using a perspective equation $D_b=f+f/ABS\ (y_i/y_0)$ where f is a focal length of a lens of the camera of the rear facing vision system which is pre-programmed in the electronic control unit, $y_i$ is a height of an image of the attached object seen by the rear facing vision system determined by the electronic control unit, $y_o$ is a height of the attached object pre-programmed into the electronic control unit and ABS $(y_i/y_0)$ is an absolute value of ABS $(y_i/y_0)$;
   determining with the electronic control unit a height $H_a$ from a top of the attached object to the camera by an equation $H_a=\sin(β)*D_b$;
   determining with the electronic control unit a height $H_b$ that the top of the attached object is above the reference plane by an equation $H_b=H_c-H_a$; and
   adjusting for error (E) with the electronic control unit to determine an adjusted height $H_{b\ adjusted}$ that the attached object is above the reference plane by equation $H_{b\ adjusted}=H_b+E$ where E is a fixed value;
determining with the electronic control unit whether the adjusted top height $H_{b\ adjusted}$ of the attached object is lower than a clearance height of the unattached object wherein the clearance height of the unattached object is a distance between a bottom of the unattached object and the ground surface,
upon determining with the electronic control unit that the adjusted top height $H_{b\ adjusted}$ of the attached object is not lower than the clearance height of the unattached object, determining with the electronic control unit whether the attached object would collide with the unattached object when the vehicle is reverse maneuvered too close to the unattached object; and
in response to the determining with the electronic control unit that the adjusted top height $H_{b\ adjusted}$ of the attached object is not lower than the clearance height of the unattached object and upon determining that the collision would occur, alerting a user of the vehicle by having the electronic control unit display on a display an alert indicating that the collision would occur.

2. The method of claim 1 wherein upon determining that the collision would occur, determining with the electronic control unit whether the vehicle is equipped with automatic reverse maneuvering and upon determining that the vehicle is equipped with automatic reverse maneuvering, having the electronic control unit cause automatic braking of the vehicle to a halt.

3. The method of claim 2 wherein determining the lateral distance $D_a$ includes determining the lateral distance $D_a$ based on the distance line closest to the rear of the vehicle that as seen by the camera is unbroken by the attached object.

4. The method of claim 1 wherein the attached object is a trailer hitch ball of a trailer hitch, the unattached object is a trailer hitch coupling of a trailer, and determining the adjusted top height $H_{b\ adjusted}$ of the attached object includes determining an adjusted top height of the trailer hitch ball.

5. A collision avoidance system for a vehicle for determining a height of an attached object attached to a rear of a vehicle and avoiding a collision between the attached object and an unattached object which is behind and unattached to the rear of the vehicle during reverse maneuvering of the vehicle on a ground surface, comprising:
 an electronic control unit coupled to a rear facing vision system of the vehicle and to a display in the vehicle, wherein
 the electronic control unit is configured to determine an adjusted top height $H_{b\ adjusted}$ of the attached object by:
  determining an angle β which is an angle between a reference plane lying on the ground surface and a line of sight of a camera of the rear facing vision system that is tangent to the attached object by an equation $β=\arctan(H_c/D_a)$ where $H_c$ is a height of the camera above the reference plane and $D_a$ is a lateral distance between a perpendicular plane which extends through the camera and a point where the line of sight intersects the reference plane and determining the lateral distance $D_a$ based on distance lines of the rear facing vision system wherein each distance line is indicative of a different distance from the rear of the vehicle,
  determining a distance $D_b$ that the attached object is away from the camera by using a perspective equation $D_b=f+f/ABS\ (y_i/y_0)$ where f is a focal length of a lens of the camera of the rear facing vision system which is pre-programmed in the electronic control unit, $y_i$ is a height of an image of the attached object seen by the rear facing vision system determined by the electronic control unit, $y_o$ is a height of the attached object pre-programmed into the electronic control unit and ABS $(y_i/y_0)$ is an absolute value of $ABS(y_i/y_0)$,
  determining a height $H_a$ from a top of the attached object to the camera by an equation $H_a=\sin(β)*D_b$,
  determining a height $H_b$ that the top of the attached object is above the reference plane by an equation $H_b=H_c-H_a$, and
  adjusting for error (E) to determine an adjusted height $H_{b\ adjusted}$ that the top of the attached object is above the reference plane by an equation $H_{b\ adjusted}=H_b+E$ where E is a fixed value,
 the electronic control unit is further configured to:
  determine whether the adjusted height $H_{b\ adjusted}$ of the attached object is lower than a clearance height of the unattached object wherein the clearance height of the unattached object is a distance between a bottom of the unattached object and the ground surface,
  upon determining that the adjusted height $H_{b\ adjusted}$ of the attached object is not lower than the clearance height of the unattached object, determine that the attached object would collide with the unattached object when the vehicle is reverse maneuvered too close to the unattached object, and
  in response to the determining that the adjusted top $H_{b\ adjusted}$ of the attached object is not lower than the clearance height of the unattached object and upon determining that the collision would occur, alert a user of the vehicle by having the electronic control unit display on a display an alert indicating that the collision would occur.

6. The collision avoidance system of claim 5 wherein upon the electronic control unit determining that the collision would occur, the electronic control unit is configured to determine whether the vehicle is equipped with automatic reverse maneuvering and upon determining that the vehicle is equipped with automatic reverse maneuvering, the electronic control unit is further configured to cause automatic braking of the vehicle to a halt.

7. The collision avoidance system of claim 5 wherein the electronic control unit is further configured to determine the lateral distance ($D_a$) based on a distance line closest to the rear of the vehicle that as seen by the camera is unbroken by the attached object.

8. The collision avoidance system of claim 5 wherein the attached object is a trailer hitch ball of a trailer hitch, the unattached object is a trailer hitch coupling of a trailer, and the adjusted top height $H_{b\ adjusted}$ of the attached object is an adjusted top height of the trailer hitch ball.

* * * * *